(12) United States Patent
Rausch et al.

(10) Patent No.: US 9,239,854 B2
(45) Date of Patent: Jan. 19, 2016

(54) MULTI-DOMAIN IMPACT ANALYSIS USING OBJECT RELATIONSHIPS

(71) Applicant: SAS Institute Inc., Cary, NC (US)

(72) Inventors: Nancy Anne Rausch, Apex, NC (US); Peter Rowland Eastwood, Cary, NC (US); Chris L. Replogle, Cary, NC (US)

(73) Assignee: SAS Institute Inc., Cary, NC (US)

( * ) Notice: Subject to any disclaimer, the term of this patent is extended or adjusted under 35 U.S.C. 154(b) by 215 days.

(21) Appl. No.: 13/913,658

(22) Filed: Jun. 10, 2013

(65) Prior Publication Data

US 2014/0280349 A1 Sep. 18, 2014

Related U.S. Application Data

(60) Provisional application No. 61/789,061, filed on Mar. 15, 2013.

(51) Int. Cl.
*G06F 17/30* (2006.01)
(52) U.S. Cl.
CPC ................ *G06F 17/30292* (2013.01)
(58) Field of Classification Search
CPC ................................................ G06F 17/30294
USPC ........................................ 707/805, 803, 810
See application file for complete search history.

(56) References Cited

U.S. PATENT DOCUMENTS

| | | | |
|---|---|---|---|
| 5,495,610 A | 2/1996 | Shing et al. | |
| 5,724,556 A | 3/1998 | Souder et al. | |
| 6,223,171 B1 | 4/2001 | Chaudhuri et al. | |
| 6,385,611 B1 | 5/2002 | Cardona | |
| 6,677,963 B1 | 1/2004 | Mani et al. | |
| 7,137,104 B2 | 11/2006 | Tip et al. | |
| 7,191,143 B2 | 3/2007 | Keli et al. | |
| 7,319,971 B2 | 1/2008 | Abrahams et al. | |
| 7,519,624 B2 | 4/2009 | Korupolu et al. | |
| 7,536,406 B2 | 5/2009 | Haselden et al. | |
| 7,690,000 B2 | 3/2010 | Farmer | |
| 8,031,634 B1 | 10/2011 | Artzi et al. | |
| 8,170,903 B2 | 5/2012 | Poissant | |
| 8,266,096 B2 | 9/2012 | Navarrete et al. | |
| 8,296,412 B2 | 10/2012 | Secor et al. | |
| 2005/0138151 A1 | 6/2005 | Lam et al. | |
| 2005/0289167 A1* | 12/2005 | Haselden et al. | ............. 707/101 |
| 2006/0064666 A1 | 3/2006 | Amaru et al. | |
| 2007/0061732 A1* | 3/2007 | Bobbin et al. | ................ 715/739 |
| 2007/0143744 A1 | 6/2007 | Clemm et al. | |
| 2008/0189154 A1 | 8/2008 | Wainwright | |

(Continued)

OTHER PUBLICATIONS

Informatica, "Metadata Manager—A Key Feature of Informatica PowerCenter Advanced Edition" (2010), 4 pages.
Hexaware Technologies, " Impact Analysis on Source & Target Definition Changes" retrieved from www.hexaware/com on Dec. 6, 2012, 3 pages.
Meta Integration, Meta Integration Product Overview, retrieved from www.metaintegration.net on Dec. 6, 2012, 8 pages.

(Continued)

*Primary Examiner* — Baoquoc To
(74) *Attorney, Agent, or Firm* — Kilpatrick Townsend & Stockton LLP

(57) ABSTRACT

Systems and methods for impact analysis across multiple domains using non-data types of relationships between objects are provided. A data model can be formed. The data model can include objects representative of physical data in separate domains and relationships of non-data types between the objects. An impact analysis interface can be generated using the data model. The impact analysis interface can depict the objects and the non-data types of relationships between the objects.

33 Claims, 8 Drawing Sheets

(56) References Cited

U.S. PATENT DOCUMENTS

| | | |
|---|---|---|
| 2009/0259501 A1 | 10/2009 | Poissant |
| 2010/0079462 A1 | 4/2010 | Breeds et al. |
| 2010/0153908 A1 | 6/2010 | Sarkar et al. |
| 2011/0099050 A1 | 4/2011 | Coldicott et al. |
| 2011/0119530 A1 | 5/2011 | Lazzaro |
| 2011/0313800 A1 | 12/2011 | Cohen et al. |
| 2012/0137243 A1* | 5/2012 | Armstrong et al. ........... 715/772 |
| 2012/0215592 A1 | 8/2012 | Amaru et al. |

OTHER PUBLICATIONS

IBM, "Impact Analysis with Rational Architecture Management Tools" retrieved from www.ibm.com/developerworks/rational/library on Dec. 6, 2012, 13 pages.

Web Studio Lineage Import Tool, retrieved from AppData/Local/Microsoft/Windows/Temporary on Apr. 23, 2013, 12 pages.

SAS Institute, Inc. Relationship Modeling (2012), 32 pages.

\* cited by examiner

MULTI-DOMAIN IMPACT ANALYSIS USING OBJECT RELATIONSHIPS

CROSS-REFERENCE TO RELATED APPLICATIONS

The present disclosure claims priority to U.S. Patent Application Ser. No. 61/789,061, filed Mar. 15, 2013 and titled "Impact Analysis Using Object Relationships," the entirety of which is incorporated herein by reference.

TECHNICAL FIELD

The present disclosure generally relates to computer-implemented systems and methods for impact analysis of multiple domains.

BACKGROUND

Impact analysis can be used to understand how a domain is constructed. Systems and methods can allow for impact analysis across multiple domains.

SUMMARY

In accordance with the teachings provided herein, systems and methods for impact analysis across multiple domains using non-data types of relationships between objects are provided.

For example, a computer-implemented method can include forming, by a computing device, a data model. The data model includes objects representative of physical data in separate domains. The data model also includes relationships of non-data types between the objects. An impact analysis interface is generated using the data model. The impact analysis interface depicts the objects and the non-data types of relationships between the objects.

In another example, a system is provided that includes a processor and a non-transitory computer-readable storage medium containing instructions that when executed on the processor cause the processor to perform operations. The operations include forming a data model. The data model includes objects representative of physical data in separate domains. The data model also includes relationships of non-data types between the objects. An impact analysis interface is generated using the data model. The impact analysis interface depicts the objects and the non-data types of relationships between the objects.

In another example, a computer-program product tangibly embodied in a non-transitory machine-readable storage medium is provided that includes instructions that can cause a data processing apparatus to form a data model. The data model includes objects representative of physical data in separate domains. The data model also includes relationships of non-data types between the objects. An impact analysis interface is generated using the data model. The impact analysis interface depicts the objects and the non-data types of relationships between the objects.

The details of one or more embodiments are set forth in the accompanying drawings and the description below. Other features and aspects will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
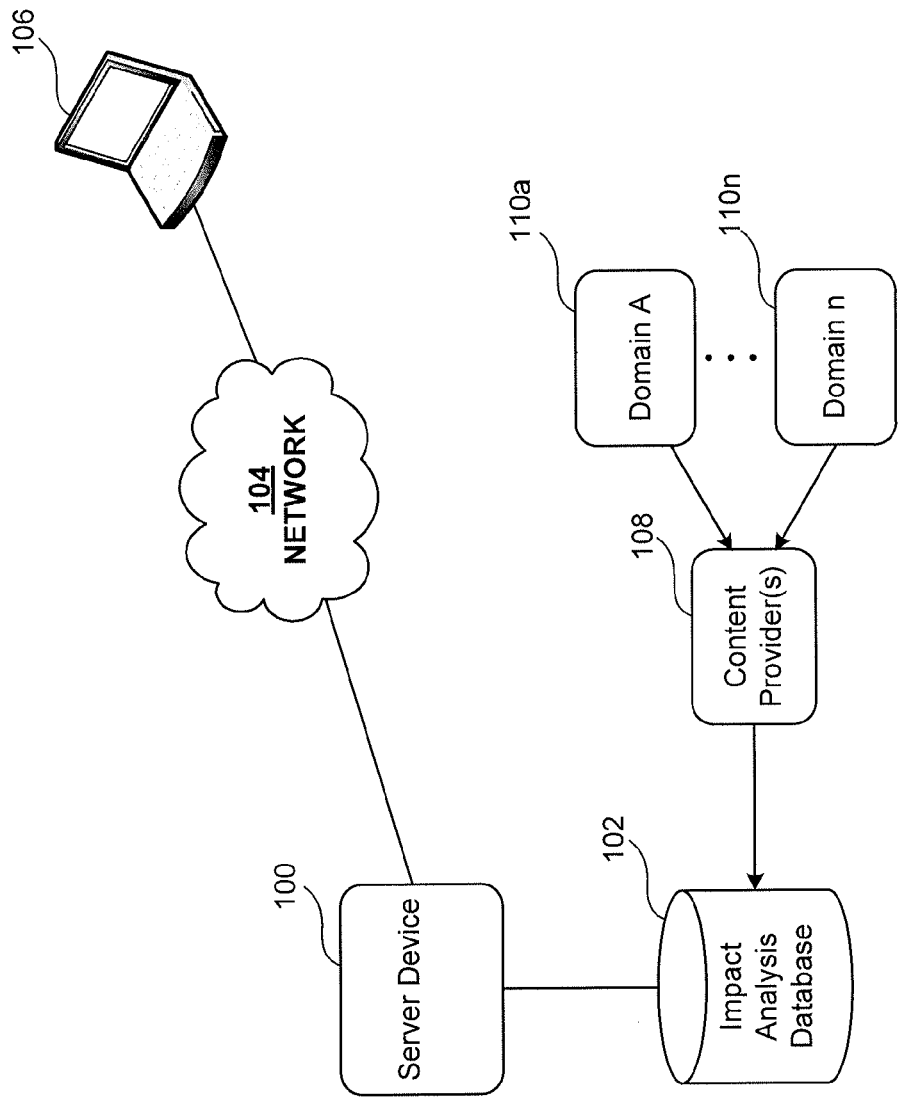
FIG. 1 shows an example of an environment that includes a web server device and an impact analysis database that can communicate with other devices.

Certain aspects relate to a methodology and visualization technique for support of diverse types of impact analysis relationships between objects in multiple domains. A methodology and a visualization technique can be used to document relationship types and object types for impact analysis in a scoped manner. A set of visual components can be provided that leverages the information stored in a data model for visualizing impact analysis. Impact analysis information can be very big as the dependencies between objects in a large-scale enterprise can be significant. The visual components can support "scoping." Scoping can provide the user the ability to ask for impact analysis information on demand and by subject rather than returning all information from domains. This can help with performance in returning the information faster that the user is requesting, and can also help with understanding by limiting the information to the objects that the user is most interested in, and allowing the user to explore for more details as needed.

Impact analysis (i.e., lineage) can include the ability to identify relationships in a domain for the purposes of understanding how a domain is put together, and answering questions such as "what is the impact that a change will have on a domain" and "what objects would have to be modified if something is changed upstream or downstream in the domain." Impact analysis techniques can support the showing of a dependency relationship between metadata representations of objects that are "physical" in nature (i.e., objects that represent items like tables, columns, etc., that are physical objects in a domain). These techniques can represent how data flows from sources to targets of a domain.

Many more objects in a domain can contribute to the overall infrastructure of the domain but are not part of the actual "dependency" flow of data through that domain. These objects can have meaningful information to convey and these objects may be impacted when looking at the impact a change may have in an enterprise that includes one or more domains. An example of these objects can include documentation associated with a table that may help explain precisely what impact a change in a table would have on content downstream of the table such as a report or job. Furthermore, other objects may be impacted that are not directly in the data flow path such as governance or compliance standards. Another example is an object indicating that a user may want or need to be notified that a change is occurring. Another example is that third-party content, such as other applications, source domains, or target domains, may be impacted that is not directly related to a data flow path. Objects from different domains may represent the same object (i.e., are equivalent) and the equivalency can be documented.

In some aspects, a data model can be generated that is optimized for impact analysis and fast storage and retrieval, and that can account for various objects. An impact analysis interface can be generated for retrieving content from the data model for visualizing content that can be scoped, such as by being filtered, so that useful and meaningful requested information can be presented. The impact analysis interface can depict representations of objects and relationships and an impact analysis can be made from the interface. Any type of content may be supported, including content from third-party systems and from diverse systems within an enterprise. In some aspects, an interface is provided for populating content into the data model. The data model may be queried directly if, or when, needed for reports or visuals using standard SQL language constructs.

In some aspects, a type dictionary can be extended for object types and icons, and can be initially populated from known types. A type dictionary may be extended for relationships, and can be initially populated with common types of relationships between objects. Examples of relationships include dependency relationship (e.g., jobs depends on tables) and association relationship (e.g., documents are associated to reports).

The relationships may also include non-data types of relationships, such as a parent/child, inclusion, synonymous, and equivalent. An example of a parent/child relationship includes hierarchies in a data model. Examples of an inclusion relationship are a library that includes tables, a job that includes transformations, and a business term that includes reports. Examples of synonymous relationships include a business term that is synonymous with another business term and a third-party object that is synonymous with an item modeled in an entity environment. Examples of equivalent relationships include a table in one source domain that is equivalent to a table in another source domain and a business term in one domain that is equivalent to a business term in another domain.

FIG. 1 is an example of an environment in which certain aspects may be implemented using a server device 100 and an impact analysis database 102. The server device 100 can communicate through one or more networks 104 with other devices, such as a computing device 106 that can display content in a web browser or other interface.

The impact analysis database 102 can receive and store content from one or more content provider(s) 108 that receive data from multiple domains 110a-n. The content provider(s) 108 can extract the data from the multiple domains 110a-n, shown as Domain A 110a to Domain n 110n, and provide the content to the impact analysis database 102. The multiple domains 110a-n may each be separate entities, platforms, enterprises, or other infrastructure. The content can include information about objects and relationships between objects in the multiple domains 110a-n. Examples of objects include tables, reports, maps, terms, collections, tags, process jobs, data jobs, domains, user accounts, and links. The relationships can include data and non-data relationships. Examples of relationships include dependency relationships, parent/child relationships, inclusion relationships, association relationships, synonymous relationships, and equivalent relationships.

The server device 100 can generate user interfaces using the objects and relationships among objects of multiple domains and provide the user interfaces to the computing device 106 over the network. The server device 100 can also receive requests and commands from the computing device 106, and configure the user interfaces to be provided to the computing device 106 in response to the requests and commands.

Although depicted separately, the server device 100 may include the impact analysis database 102 and/or the content provider(s) 108. In some aspects, the server device 100 includes at least one of the multiple domains 110a-n. Examples of the impact analysis database 102 can include relational database management systems (RDBMS), a multi-dimensional database (MDDB), such as an Online Analytical Processing (OLAP) database, Apache™ Hadoop® software, etc.

Figure 2:
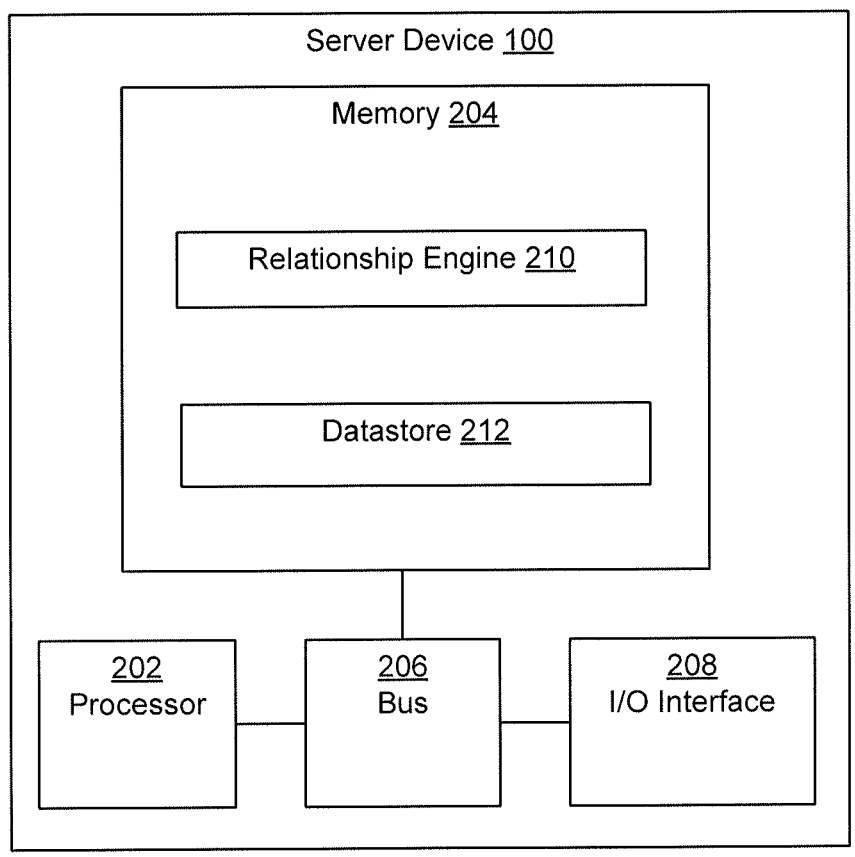
FIG. 2 shows a block diagram of an example of the web server device of FIG. 1.

FIG. 2 depicts a block diagram with an example of the server device 100. Other examples may of course be utilized. The server device 100 includes a processor 202, a memory 204, and a bus 206. The memory 204 includes a tangible computer-readable memory on which code is stored. The processor 202 can execute code stored in the memory 204 by communication via the bus 206 to cause the server device 100 to perform actions. The server device 100 can include an input/output (I/O) interface 208 for communication with other components, such as network 104 and impact analysis database 102 of FIG. 1. The server device 100 may be any device that can process data and execute code that is a set of instructions to perform actions. Examples of the server device 100 include a database server, a web server, desktop personal computer, a laptop personal computer, a handheld computing device, and a mobile device.

Examples of the processor 202 include a microprocessor, an application-specific integrated circuit (ASIC), a state machine, or other suitable processor. The processor 202 may include one processor or any number of processors. The processor 202 can access code stored in the memory 204 via the bus 206. The memory 204 may be any non-transitory computer-readable medium configured for tangibly embodying code and can include electronic, magnetic, or optical devices. Examples of the memory 204 include random access memory (RAM), read-only memory (ROM), a floppy disk, compact disc, digital video device, magnetic disk, an ASIC, a configured processor, or other storage device.

Instructions can be stored in the memory 204 as executable code. The instructions can include processor-specific instructions generated by a compiler and/or an interpreter from code written in any suitable computer-programming language. The instructions can include an application, such as a relationship engine 210, that, when executed by the processor 202, can cause the server device 100 identify objects and relationships and generate user interfaces for facilitation of impact analysis. The memory 204 can also include a datastore 212 in which content and data can be stored.

Figure 3:
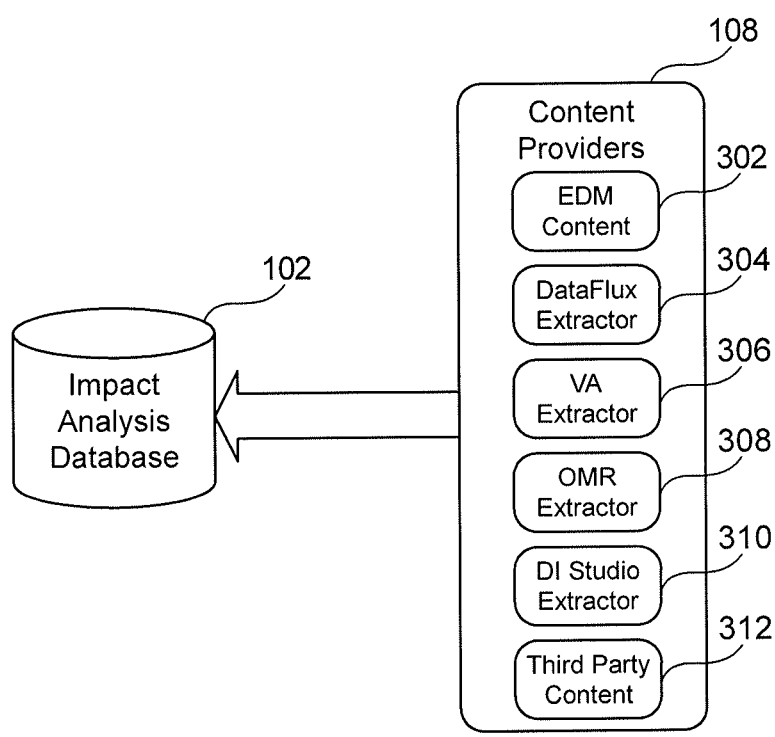
FIG. 3 shows an example of the impact analysis database of FIG. 1 that can receive data from content providers.

FIG. 3 depicts an example of content providers 108 that can extract content from data and provide the content to an impact analysis database 102. The content can include information, such as object identification, object attributes, relationships among objects, and relationship types. The content providers 108 may be extractors that can extract content from data of multiple domains and cause the impact analysis database 102 to store the content, or otherwise populate the database and cache object relationships.

Examples of extractors or other types of content providers are shown and include electronic data management (EDM) content provider 302, DataFlux extractor 304, visual analytics (VA) extractor 306 that may include a visual data builder, open metadata repository (OMR) extractor 308, data integration (DI) studio extractor 310, and third-party content 312. Other types of extractors can be used.

Figure 4:
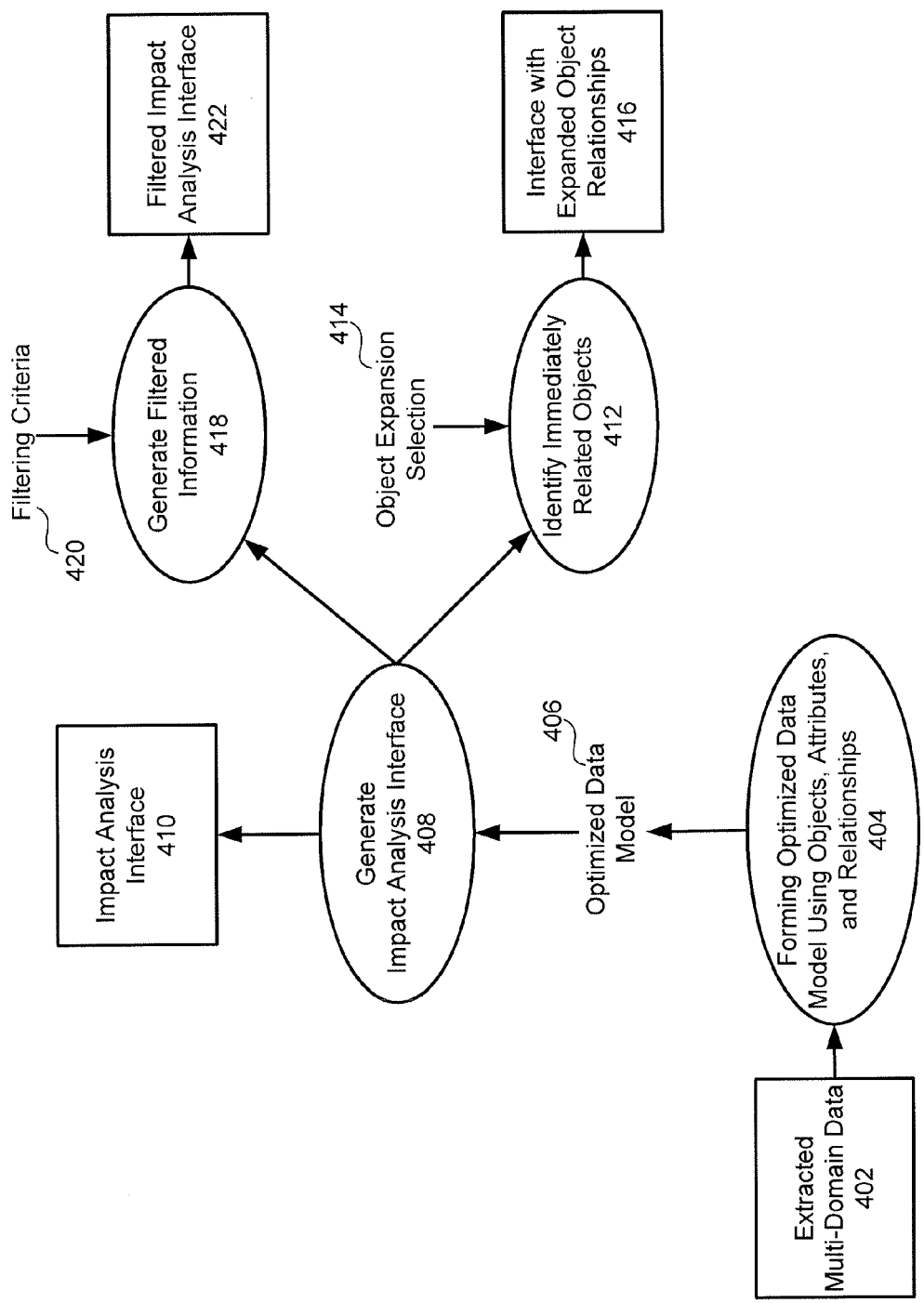
FIG. 4 shows an example of a data flow diagram that includes processes for generating an optimized data model and an impact analysis interface.

FIG. 4 is a data flow diagram that depicts an example of certain processes that can be performed by the server device 100 of FIG. 2. The processes are described with reference to examples shown in FIGS. 5-8, but other examples can be used.

The server device 100 can receive extracted multi-domain data 402, such as content from an impact analysis database that includes objects, object attributes, and relationships. The server device 100 can perform a forming process 404 by forming an optimized data model 406 using objects, attributes, and relationships from the extracted multi-domain data 402. The optimized data model 406 can include objects represented of physical data in separate domains and relationships of non-data types between the objects.

Figure 5:
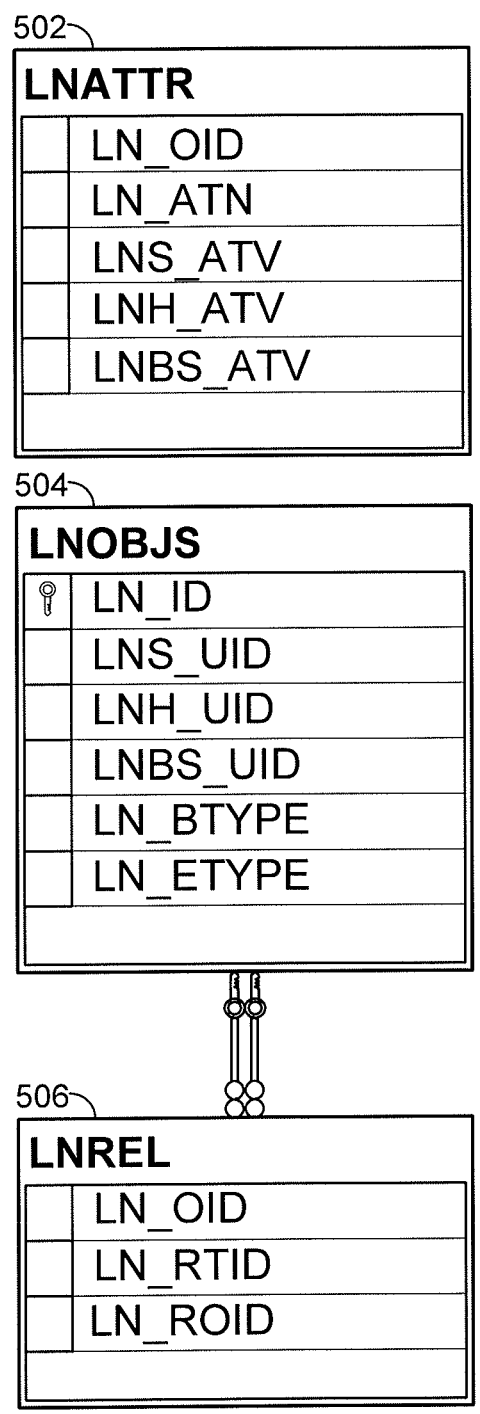
FIG. 5 shows examples of data tables of an optimized data model.

FIG. 5 depicts an example of an optimized data model. The optimized data model in FIG. 5 may be a high-speed data model that can provide for fast retrieval and storage of object attributes and relationships, and facilitate generation of visuals, such as user interfaces. The optimized data model includes a table of object attributes 502 (labeled "LNATTR"), a table of objects 504 (labeled "LNOBJS"), and a table of relationships (labeled "LNREL") 506.

The table of objects 504 can include objects that represent physical data in separate domains. The table of relationships 506 can include relationships of non-data types between the objects. The table of relationships 506 may also include relationship metadata such as the type of relationship and direction of relationship, such as in which direction to read and/or write data between objects.

The table of object attributes 502 can include information about the objects. Attributes may include metadata. Examples of attributes can include an identity of an object, type of object, display name for the object, last modified date of the object, and a key for the object usable in an internal storage system, such as the impact analysis database of FIG. 1. Other examples of attributes include data path to access the object, more descriptive information about the object, host system path for the object, and object version.

A description of an object in the table of objects 504 can be included in the table of object attributes 502, which in this example has one row for each attribute. The table of relationships 506 can include one row per relationship. For example, if five objects are stored, the table of relationships 506 can include rows that define the types of relationships for the five objects.

The data model can allow for actions such as hovering over a term representing an object in a visual and receiving a bit of information about the object. The stored information and relationships can be information usable for impact analysis, rather than extraneous information. The optimized data model can be stored in the server device 100 or the impact analysis database 102 of FIG. 1.

Returning to FIG. 4, the server device 100 can use the optimized data model 406 in a process 408 of generating an impact analysis interface 410 that depicts the objects and the types of relationships between the objects. The impact analysis interface 410 can include objects that represent "physical" things, such as files, tables in files, columns in files, etc., and relationships, including non-data relationships, between those objects from multiple domains. The impact analysis interface 410 can be provided by the server device 100 for display on a computing device, such as computing device 106 of FIG. 1, and used for impact analysis. By using the optimized data model 406 in generating the impact analysis interface 410, the server device 100 can provide useful information quickly in connection with an impact analysis and in accordance with a user's requests without providing un-useful information, and can represent non-data relationships between objects.

Figure 6:
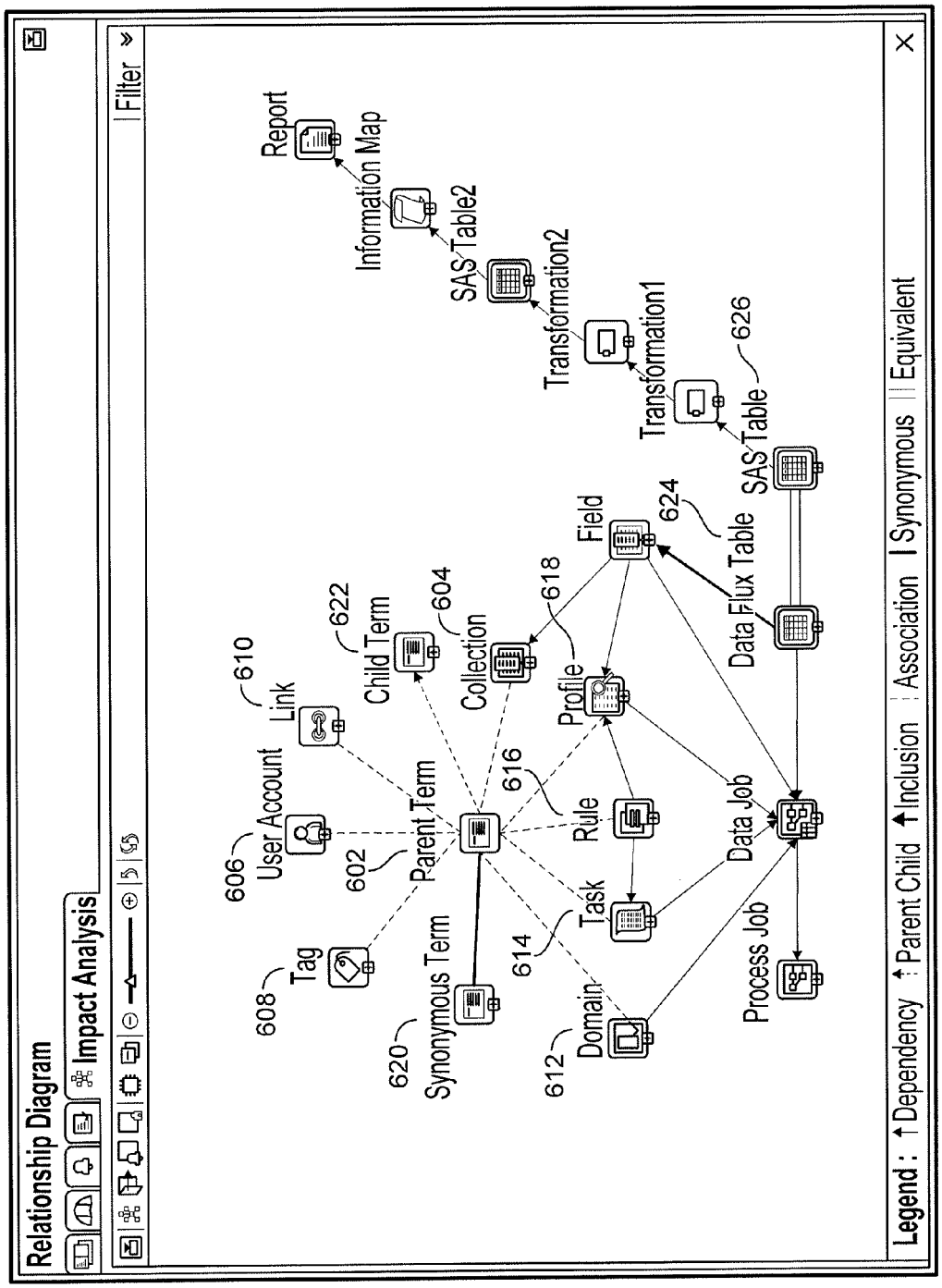
FIG. 6 shows an example of an impact analysis interface.

FIG. 6 depicts an example of an impact analysis interface 410 with example objects and example representations of types of relationships between objects of multiple domains. Different types of connecting lines and arrows between objects can represent different types of relationship. The types of relationship types represented in FIG. 6 include dependency, parent/child, inclusion, association, synonymous, and equivalent.

One object 602 shown in FIG. 6 is labeled "parent term." The impact analysis interface indicate the sources from which data about the parent term object 602 is received, or otherwise to which objects the parent term is associated. In this example, the sources include a collection object 604, a user account object 606, a tag object 608, a link object 610, a domain object 612, a task object 614, a rule object 616, and a profile object 618. The type of relationship between the parent term object 602 and these objects is represented as an association. A relationship between the parent term object 602 and a synonymous term object 620 is represented as a synonymous type of relationship. A relationship between the parent term object 602 and a child term object 622 is represented as a parent/child type of relationship.

Between a DataFlux table object 624 and a second table (labeled SAS table) object 626 may be a position at which domains are crossed. The equivalency relationship between these two objects can allow a user to determine that these tables are equivalent such that a change in one table may impact the other table.

Figure 7:
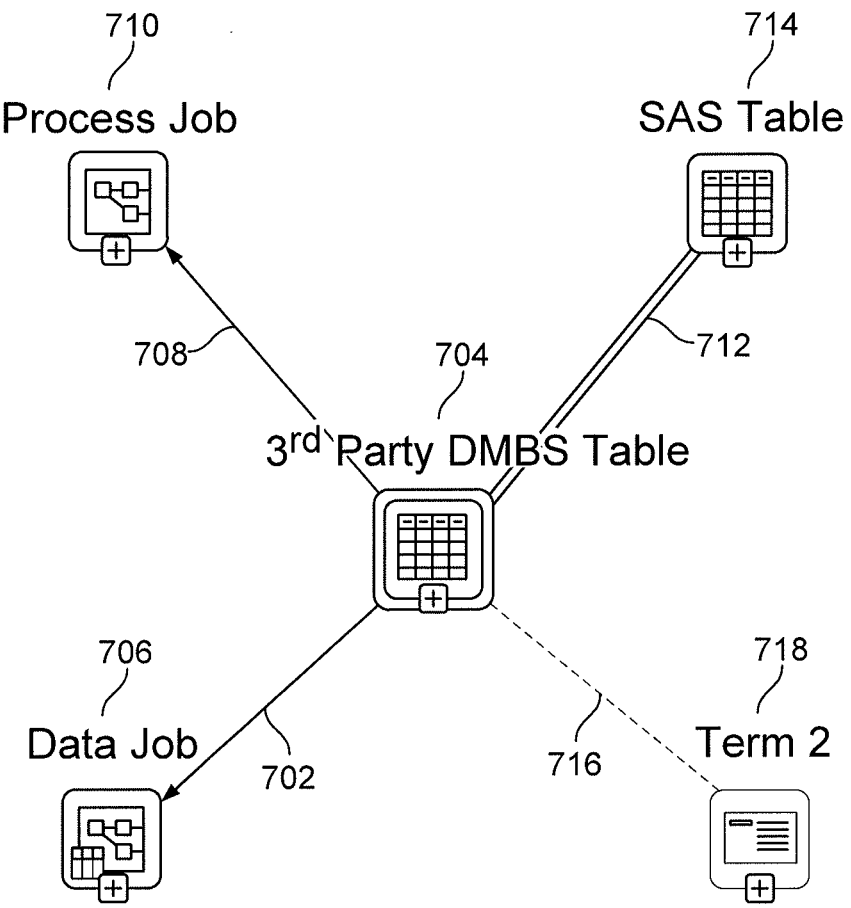
FIG. 7 shows examples of relationships that can be displayed on the impact analysis interface.

FIG. 7 depicts examples of objects and types of relationships between objects that may be included on an impact analysis interface. The types of relationships shown in FIG. 7 include a dependency relationship 702 between a third-party DMBS table object 704 and a data job object 706 and a dependency relationship 708 between the third-party DMBS table object 704 and a process job object 710. An equivalent relationship 712 is shown between the third-party DMBS table object 704 and a SAS table object 714. An association relationship 716 is shown between the third-party DMBS table object 704 and a term 2 object 718.

The server device 100 can respond to user commands by changing the information on the impact analysis interface 410. The server device 100 can perform an identification process 412 in FIG. 4 using an object expansion selection 414 received from a computing device to provide an impact analysis interface with expanded object relationships 416. For example, each object in the impact analysis interface in FIG. 6 can be associated with a plus symbol ("+") that is selectable by a user to allow the immediately related objects to that object to be displayed. The immediately related objects can include those objects having a direct relationship to the object associated with the plus symbol selected by the user, such as those objects having a relationship the object without any intervening objects. An initial visualization may include just the parent term object 602 and the server device 100 can display further, related objects in response to user commands.

The impact analysis interface may also include a selectable command to cause the server device 100 to display information from a third-party data source about the object. A link to the third-party data source can be registered and, when the command is selected, can allow content from the third-party data source to be displayed via a web page, for example.

Figure 8:
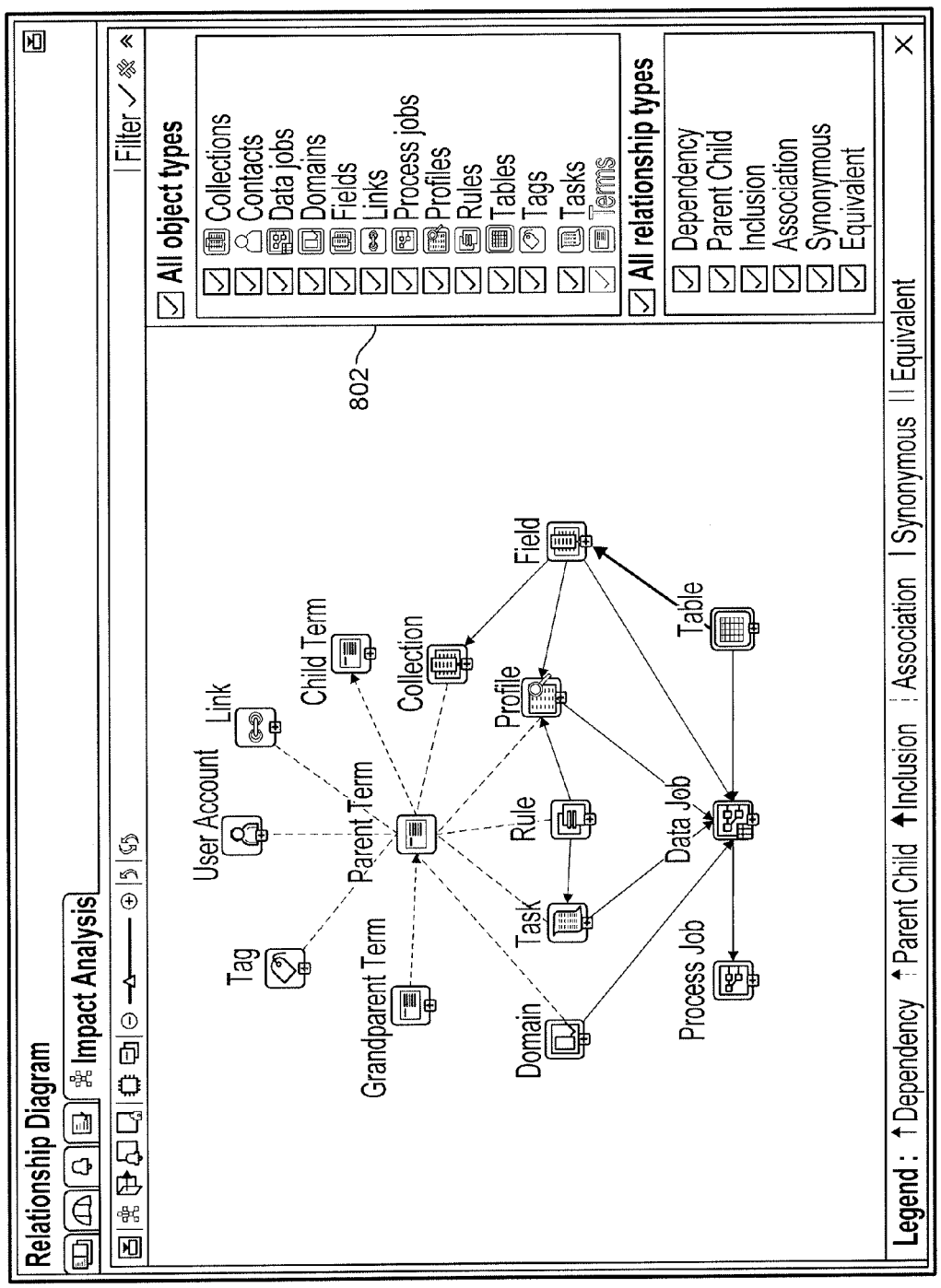
FIG. 8 shows an example of the impact analysis interface with filtering options.

The server device 100 can perform a generation process 418 in FIG. 4 by generating filtered information using filtering criteria 420 received from a computing device to provide a filtered impact analysis interface 422. FIG. 8 depicts an example of an impact analysis interface having selectable options 802 through which the server device 100 can receive filtering criteria. For example, the server device 100 can receive an identification of the object types and the relationship types desired by the user and can filter content shown in the impact analysis interface in accordance with the filtering criteria.

Filtering and allowing immediately associated objects to be selectably displayed can allow for data scoping by, for example, displaying information that is relevant to a user and allowing user control over the information displayed. Impact analysis information can be very big as the dependencies between objects in a large-scale enterprise can be significant. Scoping can provide the user the ability to request for impact analysis information on demand and by subject rather than returning all information from the domains. This can help with performance in returning the information faster that the user is requesting, and can also help with understanding by limiting the information to the objects that the user is most interested in, and allowing the user to explore for more details as needed.

Impact analysis on physical data, in addition to source domains, target domains, business network, data, logical reports and third party objects, can be facilitated using certain aspects of the server device 100 and impact analysis database 102. The physical data and the logical metadata can be tied together. If there is a change to the physical data, then the non-physical data changes too and those changes can be detected and visually displayed for analysis.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, a data processing apparatus.

The computer readable medium can be a machine readable storage device, a machine readable storage substrate, a memory device, a composition of matter effecting a machine readable propagated communication, or a combination of one or more of them. The term "data processing device" encompasses all apparatus, devices, and machines for processing data, including by way of example a programmable processor, a computer, or multiple processors or computers. The device can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code), can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and a device can also be implemented as, special purpose logic circuitry, e.g., an FPGA (field programmable gate array) or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example, semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims. For example, the actions recited in the claims can be performed in a different order and still achieve desirable results.

What is claimed is:

1. A computer-implemented method, comprising:
   forming, by a computing device, a data model that includes (i) objects representative of physical data in separate domains and (ii) relationships of non-data types between the objects; and
   generating, using the data model, an impact analysis interface that depicts the objects and the non-data types of relationships between the objects, wherein generating includes:
      generating options that are selectable on the impact analysis interface;
      receiving from a second computing device selected options as received filtering criteria; and
      identifying the options other than the selected options as unselected information; and
   data scoping information about the objects and the relationships on the impact analysis interface, wherein data scoping the information includes generating filtered information according to the received filtering criteria and modifying the impact analysis interface to include the filtered information and to the exclude unselected information.

2. The method of claim 1, wherein the relationships of the non-data types include:
   a parent/child relationship;
   an inclusion relationship;
   an association relationship;
   a synonymous relationship; and
   an equivalent relationship.

3. The method of claim 1, wherein the data model includes an object table, an object attribute table that includes object attributes, and an object relationship table that includes the relationships.

4. The method of claim 3, wherein generating, using the data model, the impact analysis interface includes:
   retrieving the object attributes and the relationships from the object table, the object attribute table, and the object relationship table; and
   displaying information about the object attributes on the impact analysis interface.

5. The method of claim 1, wherein the received filtering criteria includes an identification of an object type and a relationship type of objects and relationships to include on the impact analysis interface modified to include the filtered information,
   wherein the unselected information includes an identification of another object type and another relationship type of objects and relationships to exclude from the impact analysis interface modified to exclude the unselected information.

6. The method of claim 1, wherein different types of non-data relationships are represented on the impact analysis interface using different visual representations.

7. A system, comprising:
   a processor; and
   a non-transitory computer-readable storage medium containing instructions that when executed by the processor cause the system to perform operations including:
      forming a data model that includes (i) objects representative of physical data in separate domains and (ii) relationships of non-data types between the objects; and
      generating, using the data model, an impact analysis interface that depicts the objects and the non-data types of relationships between the objects, wherein generating includes:
         generating options that are selectable on the impact analysis interface;
         receiving from a second computing device selected options as received filtering criteria; and
         identifying the options other than the selected options as unselected information; and
      data scoping information about the objects and the relationships on the impact analysis interface, wherein data scoping the information includes generating filtered information according to the received filtering criteria and modifying the impact analysis interface to include the filtered information and to exclude the unselected information.

8. The system of claim 7, wherein the relationships of the non-data types include:
   a parent/child relationship;
   an inclusion relationship;
   an association relationship;
   a synonymous relationship; and
   an equivalent relationship.

9. The system of claim 7, wherein the data model includes an object table, an object attribute table that includes object attributes, and an object relationship table that includes the relationships.

10. The system of claim 9, wherein generating, using the data model, the impact analysis interface includes:
    retrieving the object attributes and the relationships from the object table, the object attribute table, and the object relationship table; and displaying information about the object attributes on the impact analysis interface.

11. The system of claim 7, wherein the received filtering criteria includes an identification of an object type and a relationship type of objects and relationships to include on the impact analysis interface modified to include the filtered information,
wherein the unselected information includes an identification of another object type and another relationship type of objects and relationships to exclude from the impact analysis interface modified to exclude the unselected information.

12. The system of claim 7, wherein the non-transitory computer-readable storage medium contains instructions that when executed by the processor cause the system to generate the impact analysis interface by representing different types of non-data relationships on the impact analysis interface using different visual representations.

13. A non-transitory machine-readable storage medium including instructions configured to cause a data processing apparatus to:
form a data model that includes (i) objects representative of physical data in separate domains and (ii) relationships of non-data types between the objects; and
generate, using the data model, an impact analysis interface that depicts the objects and the non-data types of relationships between the objects, wherein generating includes:
generating options that are selectable on the impact analysis interface;
receiving from a second computing device selected options as received filtering criteria; and
identifying the options other than the selected options as unselected information; and
data scoping information about the objects and the relationships on the impact analysis interface, wherein data scoping the information includes generating filtered information according to the received filtering criteria and modifying the impact analysis interface to include the filtered information and to the exclude unselected information.

14. The storage medium of claim 13, wherein the relationships of the non-data types include:
a parent/child relationship;
an inclusion relationship;
an association relationship;
a synonymous relationship; and
an equivalent relationship.

15. The storage medium of claim 13, wherein the data model includes an object table, an object attribute table that includes object attributes, and an object relationship table that includes the relationships.

16. The storage medium of claim 15, wherein the instructions are configured to cause the data processing apparatus to generate, using the data model, the impact analysis interface by:
retrieving the object attributes and the relationships from the object table, the object attribute table, and the object relationship table; and
displaying information about the object attributes on the impact analysis interface.

17. The storage medium of claim 13, wherein the received filtering criteria includes an identification of an object type and a relationship type of objects and relationships to include on the impact analysis interface modified to include the filtered information,
wherein the unselected information includes an identification of another object type and another relationship type of objects and relationships to exclude from the impact analysis interface modified to exclude the unselected information.

18. The storage medium of claim 13, wherein the instructions are configured to cause the data processing apparatus to generate, using the data model, the impact analysis interface by:
representing different types of non-data relationships on the impact analysis interface using different visual representations.

19. A computer-implemented method, comprising:
forming, by a computing device, a data model that includes (i) objects representative of physical data in separate domains and (ii) relationships of non-data types between the objects; and
generating, using the data model, an impact analysis interface that depicts the objects and the non-data types of relationships between the objects; and
data scoping information about the objects and the relationships on the impact analysis interface, wherein data scoping the information includes identifying immediately related objects to an object selected for expansion and modifying the impact analysis interface to include the immediately related objects and the relationships between the object and the immediately related objects.

20. The method of claim 19, wherein the relationships of the non-data types include:
a parent/child relationship;
an inclusion relationship;
an association relationship;
a synonymous relationship; and
an equivalent relationship.

21. The method of claim 19, wherein the data model includes an object table, an object attribute table that includes object attributes, and an object relationship table that includes the relationships.

22. The method of claim 21, wherein generating, using the data model, the impact analysis interface includes:
retrieving the object attributes and the relationships from the object table, the object attribute table, and the object relationship table; and
displaying information about the object attributes on the impact analysis interface.

23. The method of claim 19, wherein different types of non-data relationships are represented on the impact analysis interface using different visual representations.

24. A system, comprising:
a processor; and
a non-transitory computer-readable storage medium containing instructions that when executed by the processor cause the system to perform operations including:
forming, by a computing device, a data model that includes (i) objects representative of physical data in separate domains and (ii) relationships of non-data types between the objects; and
generating, using the data model, an impact analysis interface that depicts the objects and the non-data types of relationships between the objects; and
data scoping information about the objects and the relationships on the impact analysis interface, wherein data scoping the information includes identifying immediately related objects to an object selected for expansion and modifying the impact analysis interface to include the immediately related objects and the relationships between the object and the immediately related objects.

25. The system of claim 24, wherein the relationships of the non-data types include:
   a parent/child relationship;
   an inclusion relationship;
   an association relationship;
   a synonymous relationship; and
   an equivalent relationship.

26. The system of claim 24, wherein the data model includes an object table, an object attribute table that includes object attributes, and an object relationship table that includes the relationships.

27. The system of claim 26, wherein generating, using the data model, the impact analysis interface includes:
   retrieving the object attributes and the relationships from the object table, the object attribute table, and the object relationship table; and
   displaying information about the object attributes on the impact analysis interface.

28. The system of claim 24, wherein the non-transitory computer-readable storage medium contains instructions that when executed by the processor cause the system to generate the impact analysis interface by representing different types of non-data relationships on the impact analysis interface using different visual representations.

29. A non-transitory machine-readable storage medium including instructions configured to cause a data processing apparatus to:
   form a data model that includes (i) objects representative of physical data in separate domains and (ii) relationships of non-data types between the objects; and
   generate, using the data model, an impact analysis interface that depicts the objects and the non-data types of relationships between the objects; and
   data scoping information about the objects and the relationships on the impact analysis interface, wherein data scoping the information includes identifying immediately related objects to an object selected for expansion and modifying the impact analysis interface to include the immediately related objects and the relationships between the object and the immediately related objects.

30. The storage medium of claim 29, wherein the relationships of the non-data types include:
   a parent/child relationship;
   an inclusion relationship;
   an association relationship;
   a synonymous relationship; and
   an equivalent relationship.

31. The storage medium of claim 29, wherein the data model includes an object table, an object attribute table that includes object attributes, and an object relationship table that includes the relationships.

32. The storage medium of claim 31, wherein the instructions are configured to cause the data processing apparatus to generate, using the data model, the impact analysis interface by:
   retrieving the object attributes and the relationships from the object table, the object attribute table, and the object relationship table; and
   displaying information about the object attributes on the impact analysis interface.

33. The storage medium of claim 29, wherein the instructions are configured to cause the data processing apparatus to generate, using the data model, the impact analysis interface by:
   representing different types of non-data relationships on the impact analysis interface using different visual representations.

* * * * *